Oct. 2, 1962 D. R. ZUCK 3,056,564
ROADABLE AIRPLANE
Filed Dec. 14, 1959 9 Sheets-Sheet 1

INVENTOR.
Daniel R. Zuck

Oct. 2, 1962     D. R. ZUCK     3,056,564
ROADABLE AIRPLANE

Filed Dec. 14, 1959     9 Sheets-Sheet 2

INVENTOR.
Daniel R. Zuck

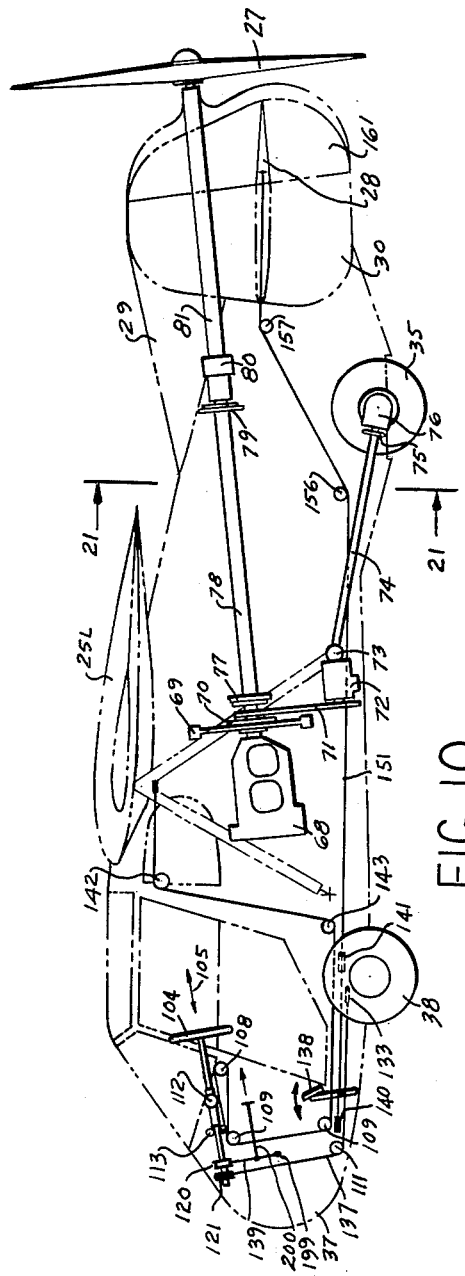
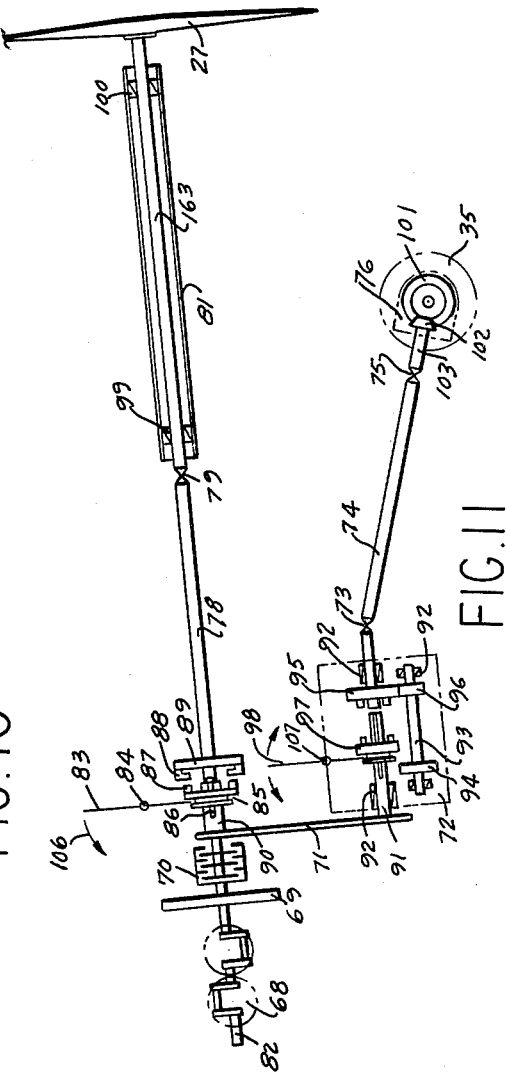

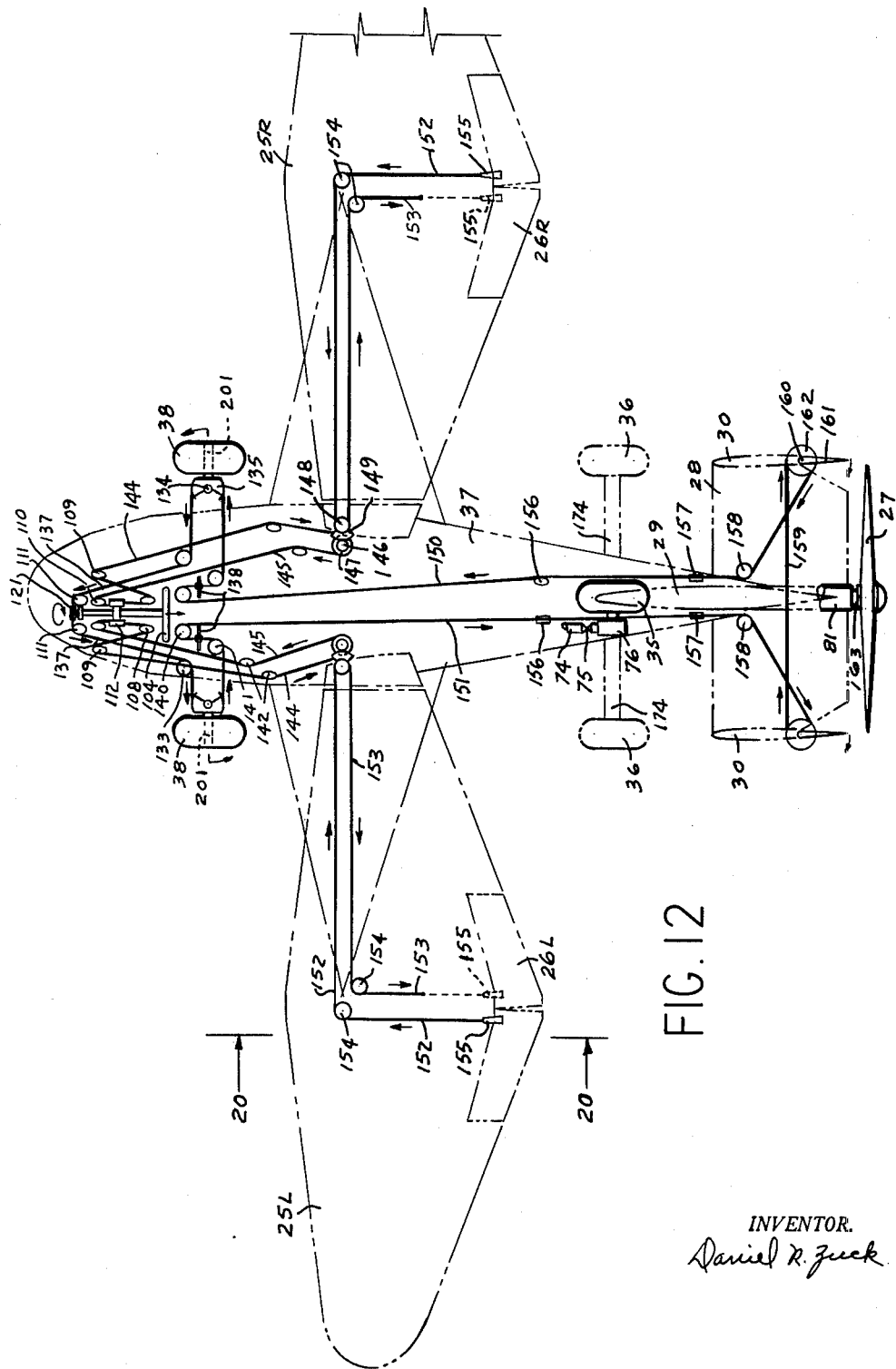

Oct. 2, 1962     D. R. ZUCK     3,056,564
ROADABLE AIRPLANE

Filed Dec. 14, 1959     9 Sheets-Sheet 6

INVENTOR.
Daniel R. Zuck

Oct. 2, 1962  D. R. ZUCK  3,056,564
ROADABLE AIRPLANE
Filed Dec. 14, 1959  9 Sheets-Sheet 7

INVENTOR.
Daniel R. Zuck

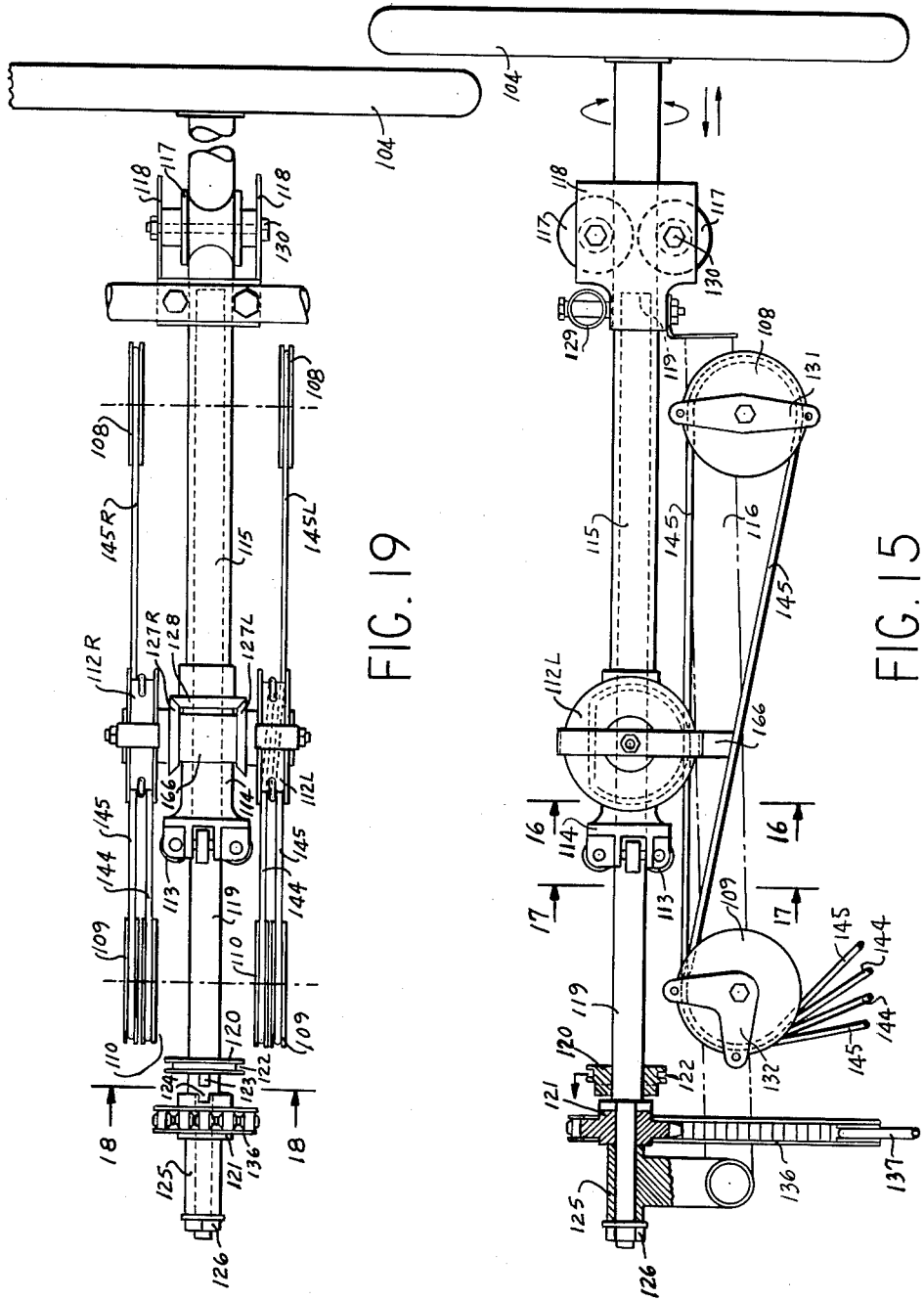

Oct. 2, 1962          D. R. ZUCK          3,056,564

ROADABLE AIRPLANE

Filed Dec. 14, 1959          9 Sheets-Sheet 9

*INVENTOR.*
*Daniel R. Zuck*

United States Patent Office 3,056,564
Patented Oct. 2, 1962

3,056,564
ROADABLE AIRPLANE
Daniel R. Zuck, 14273 Beaver St., San Fernando, Calif.
Filed Dec. 14, 1959, Ser. No. 859,526
7 Claims. (Cl. 244—2)

This invention relates to convertible aircraft suitable for flying in the air which on the ground can be converted into a road-worthy vehicle for surface transportation to and from the airport.

This invention also relates to my copending application filed on the like date of Serial Number 858,976 and titled, Folding Wings on Aircraft.

There are areas of difficulty in combining the flight capability of the airplane with the roadability of the automobile so that one vehicle can be used interchangeably on the road or in the air. These problem areas are the excessive weight of the combined vehicle, the large overall size of the combination vehicle, the landing gear and road gear location problem, the interchangeable and simultaneous use at takeoff and landing of the wheel control for flight and for ground use and the interchangeable use of the engine to drive the propeller in the air and the wheels on the ground. In these areas the characteristics of the one vehicle are incompatible with the other.

In matters of weight an automotive surface vehicle is too heavy to be converted into a flying craft. In size configuration an airplane is too large for navigation on the road because an airplane derives its lift from large, light weight wing surfaces exposed to the aerodynamic action of the air. The road gear of a surface vehicle is designed for the stability of the vehicle on the road at high speed, whereas the landing gear of an aircraft is designed for instability on the ground so that the aircraft can be rocked on the wheels for takeoff and landing. A surface vehicle uses a steering wheel control to turn the front wheels for steering on the ground whereas an aircraft uses the pilot's wheel control to bank the airplane and a rudder bar to steer the nose wheel and rudder. A common pilot's wheel control used interchangeably and simultaneously for the ground and air navigation of the vehicle is not compatible in the known wheel-control system for roadable aircraft of the type herein described. A surface vehicle uses the engine to drive the rear wheels and an aircraft uses the engine to drive the propeller.

The primary object of this invention is to combine the features of an airplane with the features of an automotive surface vehicle in the above problem areas into a useful vehicle for ground or air travel interchangeably. It is the object of this disclosure to accomplish interchangeable ground and air use of the vehicle without disassembly or detachment of the fuselage or the wings and their components.

Another object is to combine the wheel-control system of an aircraft to the control of the automotive vehicle on the ground for interchangeable use on the ground and in the air. It is the object to use the pilot's wheel control for flight control in the air and for steering control of the automotive vehicle on the ground interchangeably.

Another object tis to use a common propulsive power plant for power in the air and on the ground interchangeably.

Another object is to locate the landing wheels with respect to the center of gravity on the aircraft so that on the ground the wings may be folded aft without making the resulting vehicle light on the front wheels which are critical for steering the vehicle on the ground.

Another object for weight reduction in an aircraft is to deliver the propulsive power to a single wheel for navigation of the vehicle on the ground.

Another object is to fold the wings in a minimum size package and in the folding operation to automatically disconnect the control movement from the wheel control to the aerodynamic surfaces on the wing.

My invention is disclosed in the form of a pusher-propeller driven plane with the pilot and passengers in the fore part of the body. While this appears to be the most suitable arrangement for my invention it is conceivable that my invention can be embodied in other configurations.

In the accompanying drawings forming a part of this specification all like numbers indicate identical parts. Like numbers followed by L & R indicate similar parts of opposite hand.

In the drawings:

FIGURE 10 is a side view of the airplane in enlarged scale similar to FIGURE 3 showing the profile of the pilot's wheel control and interconnecting control system, and a profile of the power transfer from the engine to the propeller for airplane flight and to the rear wheel for automotive travel on the road.

FIGURE 11 is a schematic view showing the propulsive components to the propeller and to the rear wheel.

FIGURE 12 is a plan view in enlarged scale similar to FIGURE 5 showing in profile the pilot's wheel control and the interconnecting system to the aerodynamic surfaces and steerable front wheels for automotive travel on the ground.

FIGURE 15 is an enlarged scale view of the pilot's wheel control shown in schematic view in FIGURE 10.

FIGURE 19 is a plan view of the pilot's wheel control shown in FIGURE 15.

There are numerous airplanes that have been designed for interchangeable flight in the air as aircraft which on the ground are driven as automotive vehicles. The problem with arrangement of the ground wheels with respect to the center of gravity in these vehicles has been solved prior to this disclosure in a manner which has made these vehicles impractical as convertible aircraft in terms of weight, high cost and convenience of operation.

Figure 23:
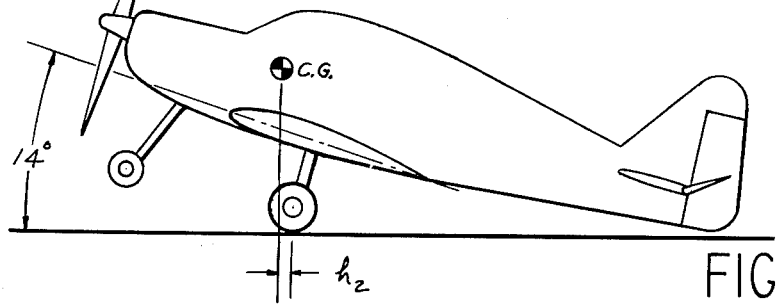
FIGURE 23 is a side view of a conventional fixed wing airplane showing the location of the center of gravity with respect to the ground wheels and the rotation of the plane on the said ground wheels to rotate the wing to an angle of incidence to lift the aircraft off the ground.
Figure 24:
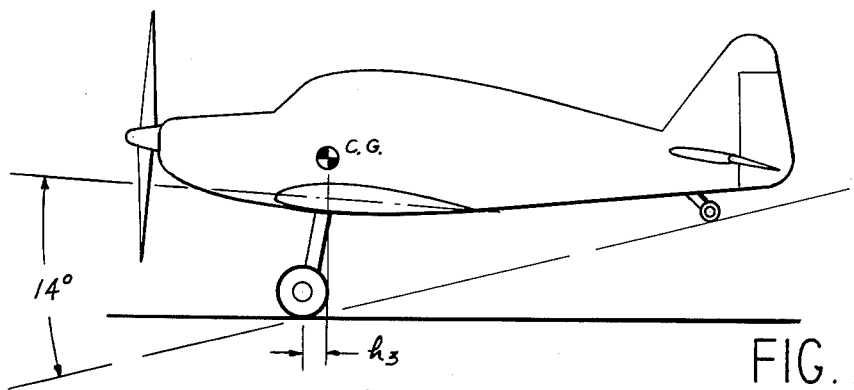
FIGURE 24 is a side view of another conventional fixed wing airplane showing the location of the wheels forward of the center of gravity with respect to the ground wheels and the rotation of the plane on the said ground wheels to rotate the wing to an angle of incidence to lift the aircraft off the ground.

Most of the above described roadable aircraft in the aircraft configuration pivot on the wheels as shown in FIGURES 23 and 24 to rotate the wing to an angle of incidence to lift the aircraft off the ground. When these aircraft are used on the ground as automotive vehicles the tail including the wings are removed, leaving only the forebody, the wheels, engine and the pilot's cabin intact. This major disassembly displaces the center of gravity of resulting vehicle forward of the rear wheels so that the vehicle becomes a suitable automotive vehicle for traveling on the highway at high speed.

This major disassembly makes the resulting aircraft very expensive and inconvenient and impractical for use as a convertible air-ground vehicle.

This disclosure herein permits location of the rear wheels as well as the front wheels at a distance from the center of gravity so that the wings can be folded aft without displacing the center of gravity aft with respect to the wheels in a location which is critical for safe automotive travel on the highway at high speed. This relationship of the wheels to the center of gravity is disclosed in FIGURES 4 and 22 showing the rotation of the wing to an angle of incidence for lifting the aircraft off the ground.

Figure 7:
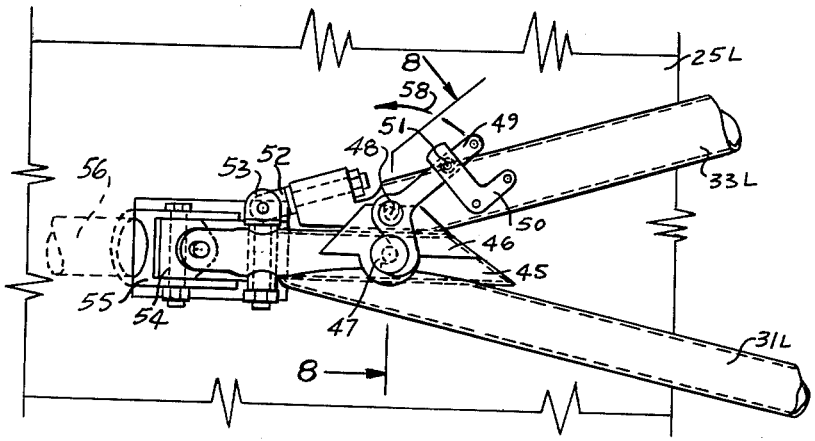
FIGURE 7 is a fragmentary view of enlarged scale taken on line 7—7 in FIGURE 1.

The airplane is a high wing monoplane with the wings 25 L & R extending outward from the fuselage 37 and supported by the struts 31 L & R, 33 L & R, and 32 L & R. The members 33 and 32 are segments of a single rear support strut to the wing, 32 being the lower segment universally coupled to the fuselage 37 at 39, and 33 being the upper segment universally coupled to the strut 31 and wing 25 as shown in FIGURE 7. The front strut 31 at the lower end is universally coupled to the fuselage 37 at 40 in FIGURES 3 and 4. At the upper end the said strut 31 is universally coupled to the wing 25. The said struts form an inverted V frame with the apex at the lower surface of the wings 25 L & R.

The propeller 27 is supported at the trailing edge of the center fin 29. Supported on the outboard ends of the horizontal stabilizer 28 are two vertical fins 30 having hinged to the fins rudders 161.

Figure 2:
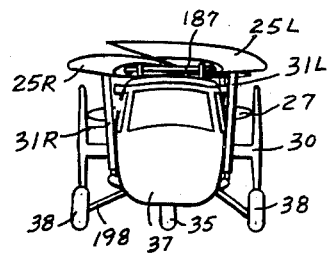
FIGURE 2 is a similar front view of the airplane with the wings folded.
Figure 4:
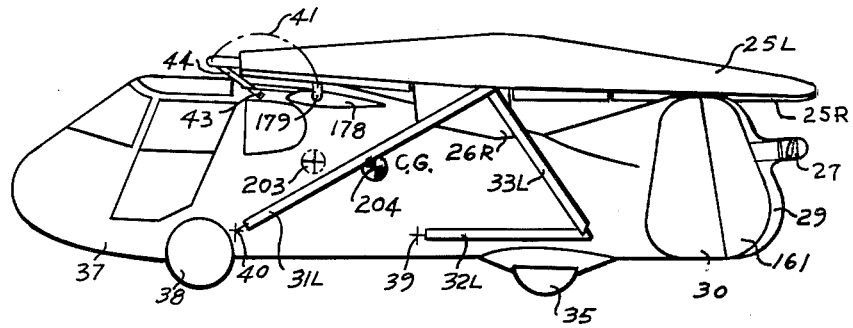
FIGURE 4 is a similar side view of the airplane with the wings folded.
Figure 6:
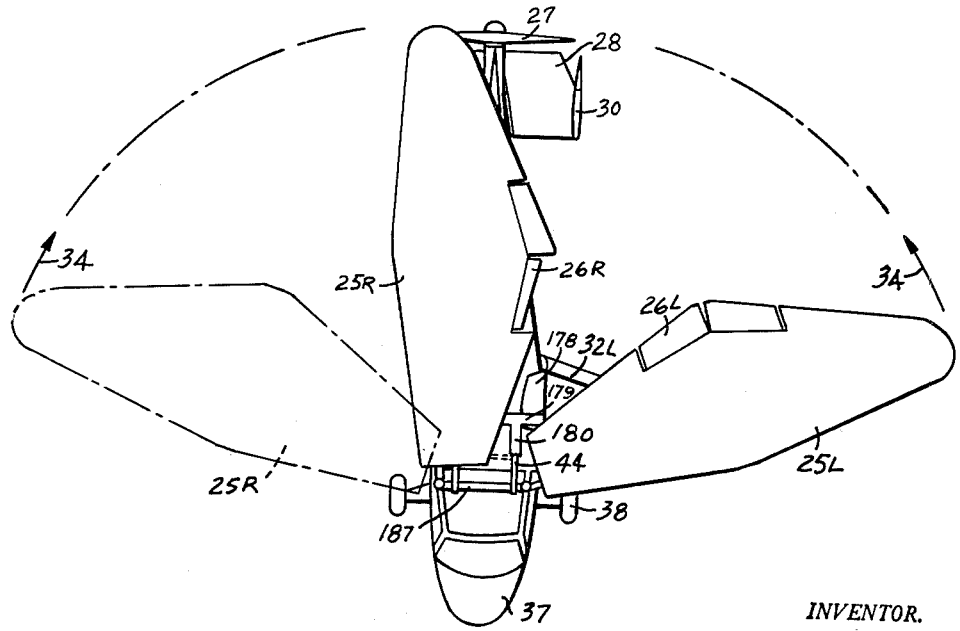
FIGURE 6 is a similar plan view of the airplane with the right wing in the folded position and the left wing is poised for final rotation into the folded position.
Figure 22:
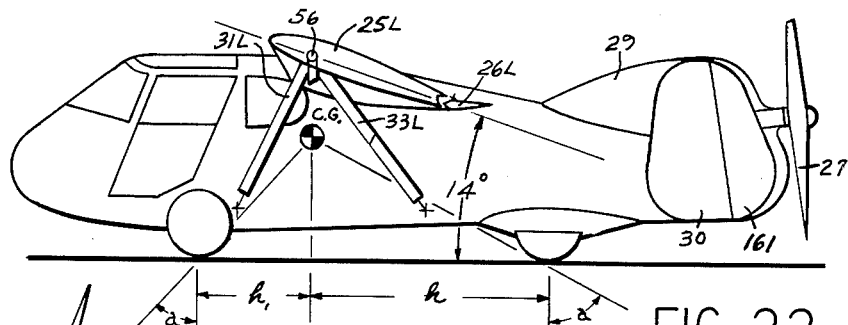
FIGURE 22 is a side view of the aircraft showing the arrangement of the ground wheels with the center of gravity of the vehicle and showing rotation of the wing to an angle of incidence to lift the aircraft off the ground.
Figure 21:
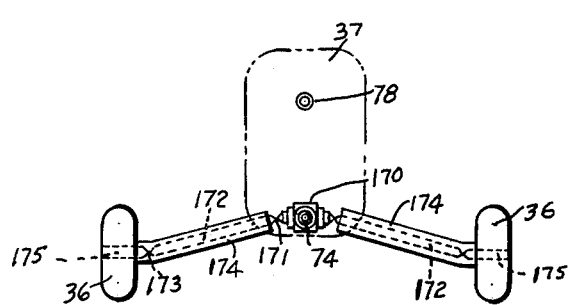
FIGURE 21 is a sectional view taken on the line 21—21 in FIGURE 10 showing an alternate two-wheel propulsive drive for the vehicle in the automative configuration.

Between the wings 25 and tail 30 there is a single main wheel 35 mounted on the center line of the fuselage 37 substantially aft of the center of gravity of the airplane as shown in FIGURE 22 to provide good balance and distribution of the weight among all the ground wheels 35 and 38 when the wings are folded as shown in FIGURES 2, 4 and 6. An alternate rear wheel arrangement is shown in FIGURES 12 and 21 showing two rear wheels 36.

A substantial distance forward of the center of gravity, FIGURES 1, 2, 5 and 22, are mounted the two wheels 38 attached to the fuselage 37 by the outward extending gear members 198 which have steerable axles 201 attached to them by the pins 134 in FIGURE 12. The said axles support the wheels and have fixedly secured to the axles the bellcrank quadrants 135 making the front wheels 38 steerable. The front wheels are sufficiently forward of the C.G. to give the road vehicle ground stability and to resist turning over on its nose when the front wheel brakes are applied as shown in FIGURE 22.

In FIGURES 10 and 11 the profile of the propulsion system is shown aft of the pilot's cabin. The propulsion system comprises a gasoline engine 68, to which is securely attached the flywheel 69. A releasable clutch 70 follows the said flywheel 69 and delivers the power to the drivechain 71 which delivers the rotary shaft power to the transmission unit 72.

The power from the clutch 70 is also delivered to the shaft 90 having the slidable member 87 which engages the member 89 at the protrusion 88. The keyway 86 keys the slidable member 87 to the shaft 90. The member 87 has a collar 85 which receives a forked lever 83 which is pivoted at 84 and moved in the direction of arrow 106 to engage the propeller shaft 78. The said propeller shaft 78 is shown disengaged in FIGURE 11.

The said propeller shaft 78 is universally journaled at the forward end to shaft 90 for free rotation within the shaft 90. The aft end of shaft 78 is universally coupled to shaft 163 by means of the universal coupling 79. The shaft 163 is supported within the bearing housing 80 and shaft housing 81. The said shaft 163 is supported at the forward end by bearing 99 and at the aft end by bearing 100, and to the said shaft 163 is fixedly secured the propeller 27. The housings 80 and 81 house and support the bearings 99 and 100. The said housings are in turn supported by the fuselage structure 37 by means which is not shown.

The propulsive power to the rear wheel 35 enters the transmission 72 through the shaft 91 which contains the slidable spur gear 97 which is keyed to the said shaft 91. The said gear 97 is slidable fore and aft by means of the lever 98 movable in the direction of the arrows and pivoted at 107 and which engages the collar on the forward side of the said gear 97. The shaft 91 is supported by bearing 92.

An idler shaft 93 supported by bearings 92 has two spur gears 94 and 96 of unequal pitch diameter. The spur gear 96 is permanently engaged with the spur gear 95 of larger pitch diameter. The spur gear 95 has an integral stub shaft which protrudes through the housing 72 and engages the drive shaft 74 by means of the universal coupling 73. The said gear 95 and said shaft are supported in the housing 72 by means of bearing 92. The spur gear 95 engages gear 97 directly when the said gear 97 is slid aft on shaft 91 for direct engagement and direct power transfer to the drive shaft 74.

When the spur gear 97 is slid forward to engage the idler gear 94 the shaft 74 rotates at a reduced speed from the input shaft 90 because of the gear reduction which takes place. A reverse gear not shown can also be engaged by the gear 97 to give reverse rotation to the shaft 74. As shown in FIGURE 11 the power is disengaged from shaft 74.

The drive shaft 74 is universally coupled to the shaft 103 and bevel gear 102 in FIGURE 11 by means of the universal coupling 75. The bevel gear 102 engages a ring gear 101 which is fixedly keyed to the wheel 35. The gears 101 and 102 including the shaft end of shaft 103 are within the housing 76.

The alternate two-wheel drive arrangement in FIGURE 21 shows a housing 170 which is similar to housing 76 in FIGURES 10 and 11 also containing similar gears 102 and 101. Additional differential gearing, however, of the commonly known variety is required to transfer the power to two wheels.

In FIGURE 21 the shaft 74 delivers the power to the wheels 36 through the above described gearing and the drive shafts 172 and the universal couplings 171 and 173 which deliver the power to the stub axles 175 which are directly keyed to the said wheels 36.

The housing 174 supports the wheels and shafting and attaches to the fuselage structure for the flexible support of the fuselage 37. Immediately above the road drive gear is seen the propeller shaft 78 in FIGURE 21.

In FIGURES 10 and 12 the interchangeable use of a common pilot's wheel control 104 for flight control of the aerodynamic surfaces 26 L & R and the ground wheels 38 is shown. The fore and aft movement of the wheel 104 imparts only control movement to the aerodynamic surfaces 26 L & R. Rotation of the wheel can turn both the wheels 38 about pivot axis 134 and differentially move the surfaces 26 L & R.

The simultaneous turning of the ground wheels and aerodynamic surfaces has been disclosed in my prior Patent 2,417,725 where the wheel 21 simultaneously turns the wheels 17 and the surfaces 15 both in the air and on the ground. This is impractical and dangerous to the safety of the airplane and the occupants because the ground and air controls conflict during takeoff and landing and cause the craft to enter destructive ground loops.

In this disclosure means are provided to disconnect the flight controls to the aerodynamic surfaces when the vehicle is steered on the ground as an automative vehicle; and in the air when the vehicle is used as an aircraft disconnecting means are provided to release the control of the pilot's wheel to the ground wheels 38.

Figure 17:
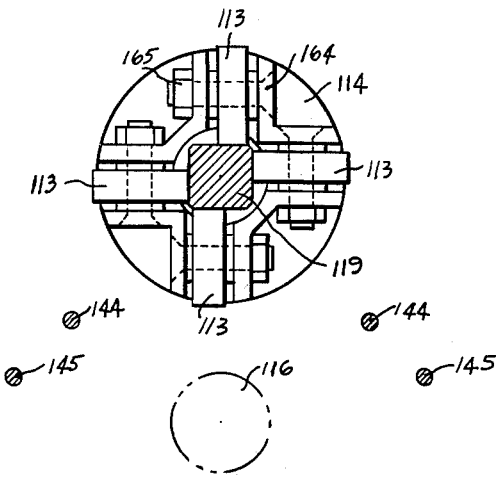
FIGURE 17 is an enlarged scale sectional view taken on the line 17—17 in FIGURE 15.

The pilot's wheel control 104 in FIGURES 15 and 19 is comprised of a shaft 115 securely keyed to wheel 104 and supported by the aft rollers 117 and forward rollers 113. The aft rollers 117 are supported by the bracket 118 which is bolted to the tubular structure member 129 of the fuselage 37. The forward rollers 113 are bolted to the fitting 114 by the screws 164 and the nuts 165 illustrated in FIGURE 17. The rollers 113 are arranged in a manner shown in FIGURES 17, 15 and 19 to transmit the torque to shaft 119 from the fitting 114.

The member 114 is fixedly secured to the shaft 115 which transmits the steering torque from the pilot's wheel 104. The said shaft 115 has fixedly secured to it a miter gear 128 to transmit the steering torque differentially to the mating miter gears 127 L & R. The said gears 127 L & R are integral with the pulleys 112 L & R.

Figure 16:
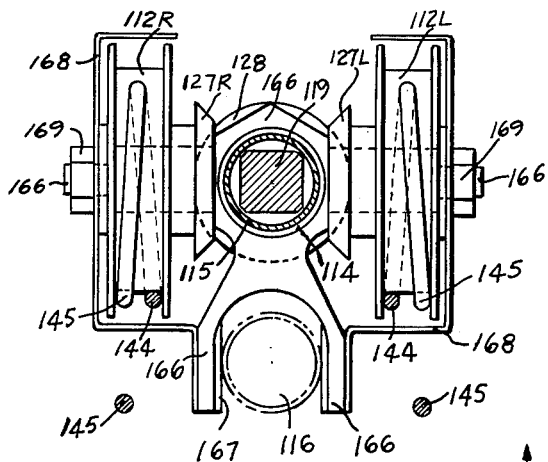
FIGURE 16 is an enlarged scale sectional view taken on the line 16—16 in FIGURE 15.

A yoke 166 in FIGURE 16 supports the pulleys and gears 112 and 127 respectively and retains the same by means of nuts 169 which also retains the cable guards 168. The yoke 166 has a downwardly extending forked end which is slidable against the member 116 to neutralize the torque forces from the gears 127 and 128 in FIGURE 16.

The cables 144 and 145 are anchored to the pulleys 112 L & R as shown in FIGURE 16.

The shaft 119 in FIGURES 15 and 19 is supported at the forward end in the bearing 125 and retained by the nut 126. The shaft 119 is squared in cross section as in FIGURES 16 and 17 except where it passes through the chain sprocket 121 and the bearing 125. The shaft 119 can freely rotate within the bearing 125 and chain sprocket 121.

Figure 18:
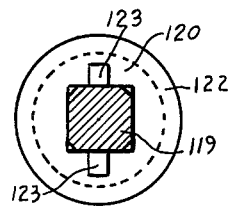
FIGURE 18 is an enlarged scale sectional view taken on the line 18—18 in FIGURE 19.

In FIGURES 19 and 18 the collar 120 has an outwardly extending projection 123 which engages the keyway type slot 124 in the hub of the chain sprocket 121. These members 121 and 120 are shown disengaged in FIGURES 15 and 19. The collar 120 in FIGURE 18 is slidable on the shaft 119 and is restrained against turning by means of the square broached hole in 120. Collar 120 also has a radial slot 122 shown in FIGURE 19. Lever 139 in FIGURE 10 is hinged to the fuselage structure 37 at 199 and engages the slot 122 of the collar 120. Connected to the lever 139 is the push-pull lever 200 which the pilot moves in the direction of the arrow to disengage and in the opposite direction to engage the steering of the ground wheels 38 through the chain sprocket 121.

The chain 136 engages the sprocket 121, FIGURES 15 and 19, and splices to the steel cables 137. In FIGURES 10 and 12 the cables 137 are led and anchored to the forward side of the cable control quadrants 135 which are fixedly secured to the wheel axles 201. The cables 137 are guided to the quadrants 135 by means of the pulleys 111 and 133.

Cables 151 and 150 are anchored to the aft side of the quadrants 135 in FIGURE 12 and are led to the rudder control quadrants 162 by means of the pulleys 141, 140, 156, 157 and 158. The pilot's rudder control pedals 138 connect to the cables 151 and 150 between the pulleys 141 and 140. In FIGURE 12 the pedals 138 are shown schematically aft of the pilot's wheel 104 for clarity. The pedals 138 are shown in their normal relationship to the pilot's wheel 104 in FIGURE 10. The cables 150 and 151 are anchored to the rudders 161.

The rudder control quadrants 162 in FIGURE 12 are fixedly secured to the rudders 161. The rudders 161 are hinged to the fins 30 which in turn are supported on the horizontal stabilizer 28. An interconnecting control cable 159 anchored to the quadrants 162 ties the rudders 161 together and completes the control circuit from the pilot's wheel 104 to the ground wheels 38, to the pilot's rudder pedals 138 and to the rudders 161. Depending on the engagement of collar 120 in FIGURES 10, 15, 18 and 19 the wheels 38 and rudders 161 may be alternately or simultaneously steered by the use of the pilot's wheel 104 and by the pilot's rudder pedals.

Figure 20:
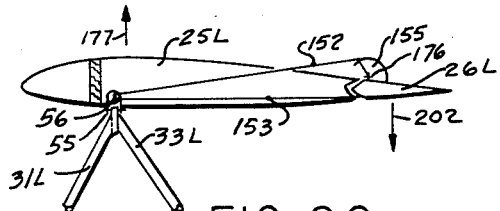
FIGURE 20 is a schematic sectional view taken on line 20—20 in FIGURE 12.

The flight control suraces 26 L & R in FIGURES 12 and 20 are connected to the pilot's wheel control 104 by means of the cables 152, 153, 144 and 145. The cables 152 and 153 are anchored to the control quadrants 155 in FIGURE 20 and they are fixedly secured to the surfaces 26 L & R. The said surfaces 26 are hinged to the wings 25 at the hinge 176. The cables 152 and 153 are guided inboard by means of pulleys 154 and are anchored to the control pulleys 148 shown in FIGURES 12, 13 and 14. The cables 152 and 153 are within the wing member 56 as shown in FIGURES 13 and 14.

The wing member 56 is fixedly secured to an inwardly extending member 189 to which is fixedly secured the pulley bracket 188 which supports the pulley 148. A spur gear 149 is also rotationally supported by the bracket 188. An integral shaft from the gear 149 is secured to the pulley 148, and the said gear 149 through pulley 148 imparts linear motions to the cables 152 and 153.

Figure 13:
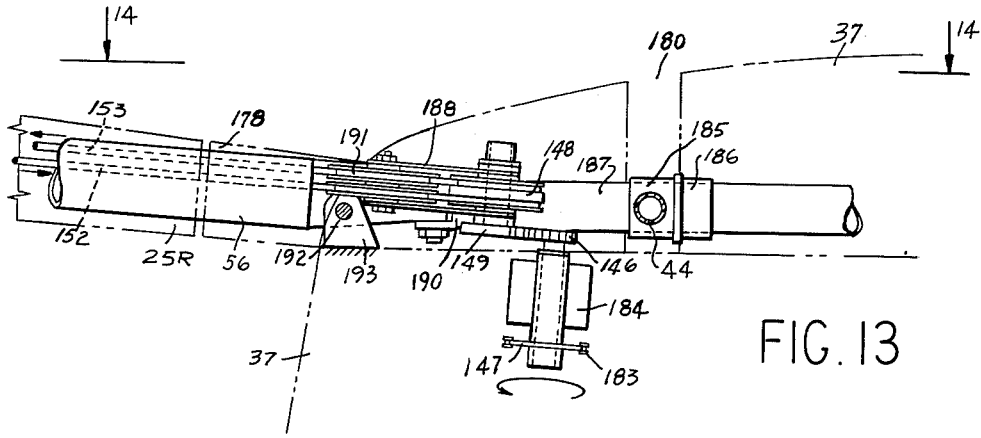
FIGURE 13 is a fragmentary view of enlarged scale taken on the line 13—13 in FIGURE 5.
Figure 14:
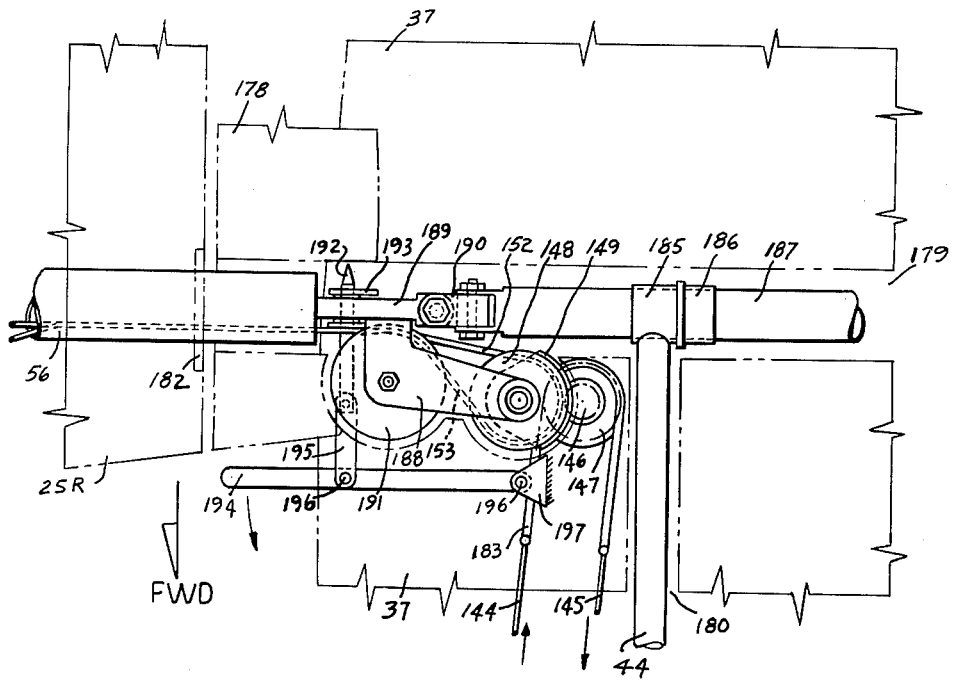
FIGURE 14 is a view taken on the line 14—14 in FIGURE 13.

To the structure of the fuselage 37 is fixedly secured the bearing housing 184 in FIGURE 13 which rotationally supports the pinion gear 146 and which meshes with the larger gear 149. The shaft of the pinion gear 146 extends downward through the housing 184 and is fixedly secured to the chain sprocket 147. Assembled in mesh with the sprocket 147 is the control chain 183 which is spliced to the control cables 144 and 145.

The cables 144 and 145 lead to the pilot's wheel control 104 by means of the guide pulleys 142, 143, 109, 110 and 108 shown in FIGURES 10, 12, 15 and 19. The pulleys 108, 109 and 110 are mounted near the wheel-control 104 unit as shown in FIGURES 15 and 19.

In FIGURES 15, 16 and 19 the cables 144 and 145 are shown anchored to the pulleys 112 L & R. When the wheel 104 is moved to the right or left of the illustration as shown by the arrows in FIGURES 15 and 19 a simultaneous and equal linear motion is imparted to the cables 145 L & R. A rotation of the pilot's wheel 104 imparts a simultaneously opposite linear travel in the cables 145 L & R in FIGURES 12 and 19.

Figure 12A:
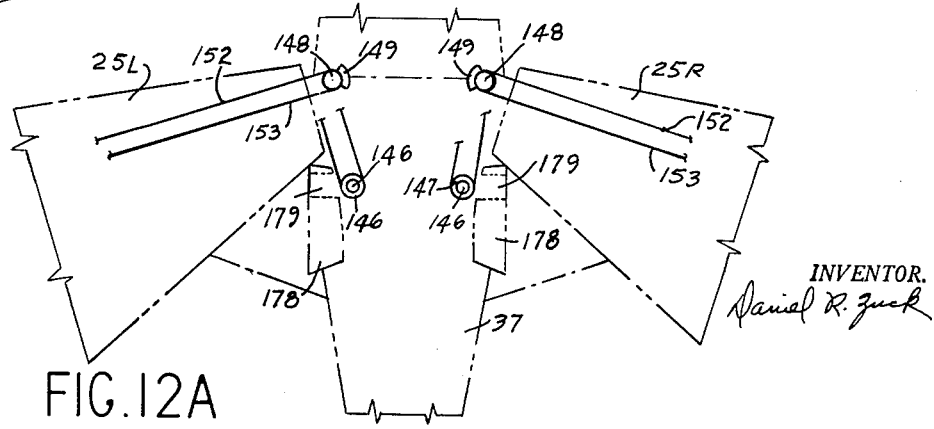
FIGURE 12A is a fragmentary view of the plane showing the wings partly folded as in FIGURE 6 with the controls to the aerodynamic surfaces in the wings separated from the controls in the body.

The flight surface controls 26 L & R become disconnected from the control of the pilot's wheel 104 when the wings are folded as shown in FIGURES 2, 6 and 4. This is schematically illustrated in FIGURE 12A where the pulleys 148 and gears 149 are shown separated from the sprockets 147 and 146. As the wings are folded the connection to the flight surfaces 26 L & R are separated at the pinion gear 146, which remains on the fuselage, and the larger gear 149 which travels with the wings 25 as the said wings are folded.

As illustrated in FIGURES 2, 4 and 6 the wings are folded one on top of the other as shown more specifically in FIGURE 2. The folding is accomplished in the manner more specifically described and illustrated in detail in my copending application, Folding Wings on Aircraft.

Figure 9:
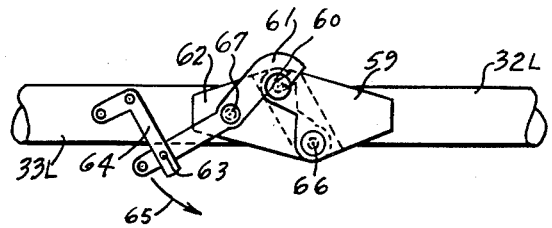
FIGURE 9 is a fragmentary detail view in enlarged scale of the rear wing-strut taken within the circle at 9—9 in FIGURE 3.
Figure 8:
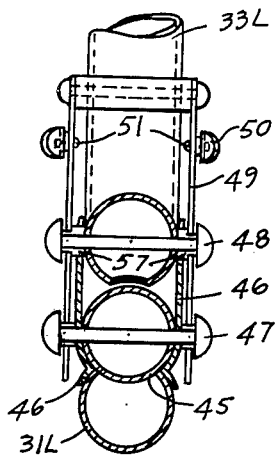
FIGURE 8 is a fragmentary view taken on the line 8—8 in FIGURE 7.

The wings are supported outboard by the previously described struts 31 and 32—33 and are universally connected at 39 and 40 to the fuselage 37; and the said struts are locked together by releasable means illustrated in FIGURES 7, 8 and 9. The inboard ends of the wings are locked to the fuselage 37 and fitting 193 by means of the releasible pins 192 as illustrated in FIGURES 13 and 14. When the wings 25 L & R are folded the inboard ends of the said wings are carried forward, FIGURE 6, on an arcuate path 41, FIGURE 4, by means of the members 44 which are hinged to the fuselage 37 at 43.

In FIGURES 13 and 14 the wings 25 L & R are interconnected for universal movement with respect to each other by the means of the transverse member 187 and the universal couplings 190. The couplings 190 are pinned to the wing member 189 and the transverse member 187 by the bolts and nuts shown.

The wing carriage member 44 at the fuselage is rotationally hinged at 43 and at the wings to the transverse member 187 by means of bearing member 185. Thrust collar 186 is fixedly secured to the member 187 and bears against the bearing member 185 and retains the wings 25 L & R in properly spaced relationship to the fuselage when the said wings are folded and extended.

The manually actuated handle 194 in FIGURE 14 releases the pin 192 through the wing member 189 by means of the link 195 which has hinged connections to the pin 192 and handle 194. Handle 194 is hinged to the fitting 197 which is fixedly secured to the fuselage 37. Movement of the handle 194 in the direction of the arrow in FIGURE 14 slides the pin 192 and releases the wing member 189, FIGURE 14, and permits the inner ends of the wings 25 L & R to move forward in the arcuate path 41, FIGURE 4, to the positions shown in FIGURE 6 with wing 25R in position indicated by the phantom lines.

When the wings are in the above described position wing 25R is permitted to move from the phantom-line position to the solid-line folded position by releasing the wing strut locks 49 and 61 in FIGURES 7, 8 and 9. The wing struts 31, 32 and 33 are then permitted to rotate into the relationship as shown in FIGURE 4 as the wing folds into position in the direction of the arrows 34 in FIGURE 6.

Means not shown are utilized to hold the wings in the folded position of FIGURE 4. Before the wing 25L can be rotated into the folded position the flight surface 26R must be dropped down as illustrated in FIGURE 4 to clear the strut 31L as shown in FIGURE 4 which is apparent in FIGURE 2. Means not shown are also utilized to retain the carriage members 44 in the forward position when the wings 25 L & R are folded.

In FIGURES 7 and 8 the strut 33L is universally coupled to the member 45 by means of the eye bolt 52 and clevis-like bolt 53. The member 45 is fixedly secured to the strut 31L and is universally coupled to the wing member 56 through the universal fitting 54 and fitting 55 by means of the bolts shown.

The releasable lock 49 in FIGURES 7 and 8 is hinged at 48 and the hinge 48 is secured to strut 33L. The lock pin 47 is fixedly secured to the member 45 through the fitting 46. The lock 49 is held in the locked position by means of the spring safety latch 50 which has a detent to receive the studs 51 in FIGURE 8.

To release lock 49 the said lock is released from the safety latches 50 and rotated in the direction of the arrow 58 in FIGURE 7. Following release of lock 61 in FIGURE 9 the strut 33L can then rotate universally with respect to strut 31L through the means of the bolts 52 and 53.

In FIGURE 9 the strut segments 33L and 32L are locked rigidly together by means of the lock 61. The lock 61 is hinged to the strut 33L at 67 in the fitting 62. The lock 61 is secured in the locked position by means of the safety spring latch 64 which latches 61 at 63. The struts 32L and 33L are hinged at 66. The pin 60 is secured to the strut 32L by means of the fitting 59 and the lock 61 grasps the pin 60. To release the lock to enable the strut 32L to hinge on the pin 66 the safety latch is disengaged at 63 and the lock 61 is rotated in the direction of the arrow 65. The angular relationship illustrated in FIGURE 4 between struts 32L and 33L can then be accomplished following release of lock 49 in FIGURE 7.

To lift the airplane off the ground in takeoff the wing is rotated to an angle of incidence as shown in FIGURE 22. To accomplish this the wings 25 L & R are hinged on the spanwise members 56 shown in FIGURES 7, 13, 14 and 20. The inboard bearing 182 for the wing 25R is shown in phantom in FIGURE 14. The outboard bearing to support the wing is located outboard of the fitting 55 in FIGURE 7 but not shown and is hinged to the member 56 which extends inboard to the fuselage 37 attachment fitting 193 in FIGURES 13 and 14.

Figure 5:
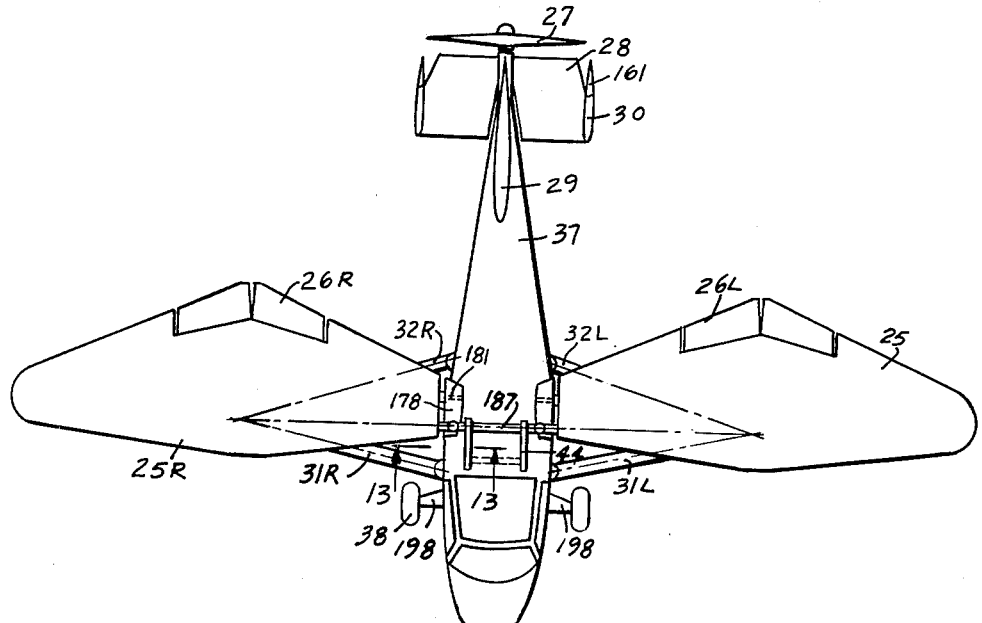
FIGURE 5 is a plan view of the airplane with the wings extended.

Rotation of the wings 25 L & R on the spanwise member 56 is controlled by the aerodynamic action of the flight control surfaces 26 L & R in FIGURES 5, 12 and 20. In FIGURE 20 the upward direction of the arrow 177 indicates the collective center of lift of the wings 25 which is aft of the hinge point of the wing 25 and which is supported by the spanwise member 56. A counterclockwise pitching force results which is counteracted and varied at 202 by means of the pilot's adjustment of the flight-control surfaces 26 L & R shown in respectively different angular relationships to the wing 25L in FIGURES 20 and 21.

Figure 1:
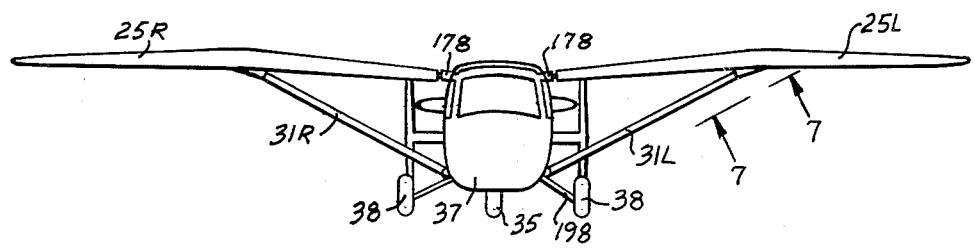
FIGURE 1 is a front view of the airplane with the wings extended.
Figure 3:
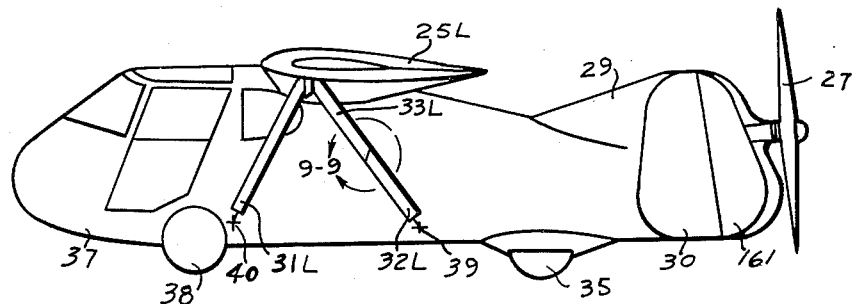
FIGURE 3 is a side view of the airplane with the wings extended.

The novel arrangement of the aircraft configuration, FIGURES 1, 3 and 5, results in an unusually compact vehicle with excellent roadability and exceptional utility when converted to an automotive vehicle for ground travel as illustrated in FIGURES 2 and 4. In FIGURE 4 the pilot's visibility for driving on the ground and flight in the air is exceptionally good because of the forward location of the pilot's cabin.

The overall size of the aircraft when converted to an automotive vehicle is approximately equivalent to that of a standard automobile. The ground wheels are well forward and well aft of the center of gravity of the automotive vehicle, FIGURES 4 and 22, to provide the required balance and steering capability, for the braking of the wheels and for application of propulsive power to the wheels.

In driving on the road the vehicle has the pilot's wheel control 104 connected to wheels 38 by shifting the collar 120, FIGURES 15 and 19, forward to engage the sprocket 121. The pilot does this with the lever 200 in FIGURE 10. For flight the collar 120 is shifted aft to disconnect the wheel control 104 from the ground wheels 38.

Turning the ground wheels 38 with the pilot's wheel 104 also moves the rudder pedals 138 and rudders 161. When the vehicle is driven on the ground as an automotive vehicle this dual control function is not adverse to the safety in controlling the vehicle. The flight control surfaces 26 L & R are disconnected, however, by virtue of the wings 25 L & R being in the folded position.

As an automotive vehicle for travel on the highways the propulsive power of the engine 68 is disconnected from the propeller 27 by shifting the lever 83 clockwise in FIGURE 11 and shifting the lever 98 counter-clockwise to engage the propulsive power to the rear wheel 35.

In the automotive configuration described above the vehicle is driven to the airport where it is converted to the aircraft configuration for flight in the air, FIGURES 1, 3 and 5.

The wings are extended from the configuration shown in FIGURES 2 and 4 in the reverse direction from the arrows 34 in FIGURE 6. The inner ends of the wings are rotated clockwise on the arcuate path 41 in FIGURE 4.

The struts 31, 32 and 33 are locked as shown in FIGURES 7, 8 and 9. The inner wings are locked to the fuselage by the clockwise movement of the lever 194 moving the pin 192 into the engaged position shown in FIGURE 14. The flight controls 26 L & R become engaged to the pilot's wheel 104 by the meshing of the gears 146 and 149 automatically when the wings are locked in the extended position.

Gears 146 and 149 could be substituted by the end mating of co-axial shafts, one shaft being on the fuselage and one shaft being on the wing, when the wings are extended. This would eliminate the friction in gear trains.

In FIGURE 10 the pilot's wheel 104 is disconnected from the wheels 38 by the movement of the push pull lever 200 in the direction of the arrow shown. The ground wheels 38 and rudders 161 are now steered by the pilot's feet on the pedals 138 for takeoff and landing.

In FIGURE 11 the propulsive power of the engine 68 is disconnected from the wheel 35 by rotation of the shift lever 98 to a neutral position as shown. The propulsive power is engaged with the propeller 27 by moving the shift lever 83 in the direction of the arrow 106 to engage the clutch members 87 and 88. The aircraft is now ready for flight.

On takeoff the airplane is run down the airport runway until takeoff velocity is reached when the wings 25 L & R are rotated to the angle shown in FIGURE 22 by the aft movement of the pilot's control wheel 104.

Rotational movement of the pilot's wheel 104 feeds differential movements to the flight surfaces 26 L & R and provides roll control of the aircraft. The rudder 161 and the ground wheels 38 are steered in the air and on the ground by the rudder pedals 138 when vehicle is used as an airplane.

The center of gravity of the vehicle is located between the front wheels 38 and rear wheel 35 a distance $h_1$ and $h$ to resist a nose-over moment on the front wheels of at least one $g$ with the wings folded and on the rear wheel 35 a turn-over moment at the wheel of at least a half a $g$ with the wings folded for stability of the vehicle on the highway when the propulsive power is applied to the rear wheel.

A one $g$ turn-over moment would result in a 45 degree angle, $a_1$ FIGURE 22, on a line through the wheel contact with the ground and center of gravity of the vehicle. Note that the conventional planes FIGURES 23 and 24 have an insignificant resistance in terms of $g$'s to overturning as illustrated by $h_2$ and $h_3$.

Having described my invention, what I claim as new and desire to secure by Letters Patent is:

1. A combination unitary vehicle for automotive travel on the highway and for flight in the air utilizing extended airplane wings, a propulsive power unit, a landing gear and a pilot's control-wheel which are convertible from air use to ground use for propulsion and for control of the vehicle on the highway when the wings are folded on top of the vehicle comprising a fuselage, wings on the fuselage having outboard supporting struts which form an inverted V-frame with the apex of the V-frame attached to the wings and the other ends of the struts attached to the fuselage, the wings having hinged supporting means on a transverse axis to the fuselage for varying the angle of incidence of the wings, aerodynamic surfaces on the wings to control the lift of the wings, means on the wings and struts to move the inboard ends of the wings forward and to fold the wings on top of the fuselage with one wing on top of the other without requiring the inverted V-frame struts to be disconnected from the said wings and said fuselage to fold the wings and to carry the wings when on the highway; a tail on the fuselage comprising a horizontal air-foil and vertical airfoil with a rudder hinged thereon; steerable ground wheels forward of the center of gravity for steering and support of the vehicle on the ground, pilot's control-wheel means connecting to the steerable ground wheels and to the rudder on the tail and to the aerodynamic surfaces on the wings, disconnecting means to disconnect the control-wheel from the aerodynamic surfaces on the wings when the wings are folded for driving the vehicle on the road and disconnecting means to disconnect the control-wheel from the steerable front wheels when the wings are extended for control of the plane in flight; a pusher propeller on the center of the fuselage aft of the tail with propulsive connecting means in the fuselage connecting to the propeller and to the propulsive power unit, a non-steerable ground-wheel located aft of the center of gravity when the wings are folded on the vehicle for support and propulsion of the vehicle on the ground and having propulsive connecting means in the fuselage from the ground-wheel to the propulsive unit, means connecting to the propulsive unit to selectively power the propeller for flight in the air when the wings are extended and the ground-wheel for highway travel when the wings are folded.

2. In a combination unitary vehicle for automotive travel on the highway and for flight in the air utilizing extended airplane wings having a propulsive power unit, a landing gear and a pilot's control-wheel convertible from air use to ground use for propulsion and for control of the vehicle on the highway when the wings are folded on top of the vehicle comprising a fuselage, wings on the fuselage having outboard supporting struts which form an inverted V-frame with the apex of the V-frame attached to the wings and the opposite ends of the struts attached to the fuselage, the wings having hinged supporting means in the wings on a transverse axis to the fuselage for varying the angle of incidence of the wings, aerodynamic surfaces on the wings to control the angle of incidence and the lift of the wings, mechanical means on the fuselage and cooperative means on the wings and struts to move the inboard ends of the wings forward and to fold the wings aft on top of the fuselage with one wing substantially on top of the other leaving the inverted V-frame struts attached at the said wings and said fuselage to fold the wings and to carry the wings when the vehicle is on the highway; locking means to retain the wings in the flight position, means to retain the wings in the folded position for highway travel, a tail on the fuselage comprising a horizontal airfoil and vertical airfoil with a rudder hinged thereon; steerable ground wheels forward of the center of gravity for steering and support of the vehicle on the ground, pilot's control-wheel means connecting to the steerable ground wheels and to the rudder on the tail and to the aerodynamic surfaces on the wings, disconnecting means to disconnect the control-wheel from the aerodynamic surfaces on the wings when the wings are folded for driving the vehicle on the road, disconnecting means to disconnect the control-wheel from the steerable front wheels when the wings are extended for control of the plane in flight; a pusher propeller on the center of the fuselage aft of the tail with propulsive connecting means in the fuselage connecting to the propeller and to the propulsive power unit, two non-steerable ground-wheels located aft of the center of gravity when the wings are folded on the vehicle for support and propulsion of the vehicle on the ground, and having propulsive connecting means including differential driving means between the two ground-wheels and driving means to the propulsive unit, means connecting to the propulsive unit to selectively power the propeller for flight in the air when the wings are extended and the ground-wheels for highway travel when the wings are folded.

3. In a combination unitary vehicle for automotive travel on the highway and for flight in the air utilizing extended airplane wings having a propulsive power unit, a landing gear and a pilot's control-wheel convertible from air use to ground use for propulsion and for control of the vehicle on the highway when the wings are folded on top of the vehicle comprising a fuselage, wings on the fuselage having outboard supporting struts which form an inverted V-frame with the apex of the V-frame attached to the wings and the opposite ends of the struts attached to the fuselage, the wings having hinged supporting means in the wings on a transverse axis to the fuselage for varying the angle of incidence of the wings, aerodynamic surfaces on the wings to control the lift of the wings, mechanical means on the fuselage and cooperative means on the wings and struts to move the inboard ends of the wings forward and to fold the wings aft on top of the fuselage with one wing substantially on top of the other leaving the A-frame struts attached at the said wings and said fuselage to fold the wings and to carry the wings when the vehicle is on the highway; locking means to retain the wings in the flight position, means to retain the wings in the folded position for highway travel, a tail on the fuselage comprising a horizontal airfoil and vertical airfoil with a rudder hinged thereon; steerable ground wheels forward of the center of gravity for steering and support of the vehicle on the ground, pilot's control-wheel means connecting to the steerable ground wheels and to the rudder on the tail and to the aerodynamic surfaces on the wings, disconnecting means to disconnect the control-wheel from the aerodynamic surfaces on the wings when the wings are folded for driving the vehicle on the road, a pusher propeller on the center of the fuselage aft of the tail with propulsive connecting means in the fuselage connecting to the propeller and to the propulsive power unit, two non-steerable groundwheels located aft of the center of gravity when the wings are folded on the vehicle for support and propulsion of the vehicle on the ground, and having propulsive connecting means including differential driving means between the two ground-wheels and driving means to the propulsive unit, means connecting to the propulsive unit to selectively power the propeller for flight in the air when the wings are extended and the ground-wheels for highway travel when the wings are folded.

4. A combination vehicle interchangeably convertible for flight in the air as an airplane and for driving on the ground as an automotive vehicle comprising a fuselage, wings on the fuselage having outboard supporting struts forming an inverted V frame with the apex of the V at the wings, aerodynamic surfaces on the wings to control the lift of the wings, means on the wings and struts to fold the wings aft with one wing on top of the other and on top of the fuselage without disconnecting the inverted V members from the wings and fuselage, a tail on the fuselage comprising a horizontal airfoil and having aerodynamic rudder means hinged thereon, a pusher propeller for aerodynamic thrust on the center of the fuselage aft of the tail, steerable ground wheels forward of the center of gravity for steering and support of the vehicle on the ground, a non-steerable ground wheel aft of the center of gravity for support and propulsion of the vehicle on the ground, pilot's wheel control means connecting to the steerable ground wheels and to the aerodynamic surfaces on the wings and to the rudder means on the tail, rudder pedal means connecting to the rudder means, disconnecting means to separate the pilot's wheel control means from the aerodynamic surfaces on the wings, disconnecting means to disconnect the said pilot's wheel control means from the ground wheels permitting the pilot's control wheel simultaneously or selectively to control the ground wheels and rudder means when the wings are folded and to exclusively control the aerodynamic surfaces on the wings when the wings are extended.

5. A monoplane having wings, a fuselage, ground supporting means fore and aft of C.G. comprising wheels on the fuselage, a pilot's cockpit in the fuselage, a pilot's control wheel in the cockpit, a propeller and propulsive driving means therefor, means for engaging and disengaging said driving means to the propeller at will, part of ground supporting means aft of the C.G., means for engaging and disengaging the said propulsive driving means to the ground supporting means at will, said wings having supporting means at the fuselage for folding the wings on top of the fuselage with one wing on top of the other, aerodynamic control surfaces hinged on the wings and control means from the pilot's control wheel to the aerodynamic control surfaces on the wings, disconnecting means to disconnect the control of the aerodynamic surfaces from the pilot's control wheel when wings are folded, steerable means on the ground supporting means on the fuselage forward of the center of gravity, control means connecting the steerable ground supporting means to the said pilot's control wheel for steering the vehicle on the ground, disconnecting means to disconnect the said pilot's control wheel from the steerable ground supporting means for flight and for takeoff and landing.

6. A monoplane having wings, a fuselage, a tail on the fuselage, ground wheels connecting to the fuselage and comprising the ground supporting means for the fuselage fore and aft of C.G., a pilot's cockpit in the fuselage, a pilot's control wheel in the cockpit, a propeller and propulsion driving means therefor, means for engaging and disengaging said driving means to the propeller at will, means for engaging and disengaging the said propulsive driving means to the ground supporting means at will, said wings having supporting means at the fuselage for folding the wings on top of the fuselage with one wing on top of the other, means connecting to the wings and fuselage to move the inboard ends of wings forward when the wings are folded, aerodynamic control surfaces hinged on the wings and control means from the said pilot's control wheel to the aerodynamic control surfaces on the wings, disconnecting means to disconnect the control of the aerodynamic surfaces from the said pilot's control wheel when the wings are folded, steerable means on the ground supporting means on the fuselage forward of the center of gravity, control means connecting the steerable ground supporting means to the pilot's control wheel for steering the vehicle on the ground, rudder means on the tail of the fuselage and control means connecting to the steerable ground supporting means, pilot's rudder pedals in the cockpit with control means connecting to the tail rudder means and to the steerable ground supporting means, disconnecting means to disconnect the pilot's control wheel from the steerable ground supporting means during flight including takeoff and landing and retaining the use of the rudder pedals for control of the steerable ground supporting means and tail rudder means.

7. A monoplane having wings, a fuselage, means on the fuselage and on the wings to fold one wing over the other on top of the fuselage, means on the fuselage and cooperative means on the wings to move the inboard ends of the wings forward when the wings are folded, spanwise rotational supporting means for the wings on the fuselage to vary the incidence of the wings for takeoff and landing, ground wheels secured to the fuselage comprising the ground supporting means fore and aft of the C.G. of the said monoplane, the forward ground supporting means having attachment means to the fuselage and location with reference to the C.G. when the wings are folded to restrain a horizontal nosing over force at the ground equal to at least 100 percent of the vertical gravity force of the monoplane, the aft ground supporting means having attachment means to the fuselage with reference to the C.G. when the wings are folded to restrain a horizontal nosing up force at the ground equal to at least 50 percent of the said vertical gravity force, a pilot's cockpit in the fuselage, a pilot's control wheel in the cockpit, a propeller and propulsive driving means therefor, means for engaging and disengaging said driving means to the propeller at will, means for engaging and disengaging the said propulsive driving means to the ground supporting means, aerodynamic control surfaces hinged on the wings and control means from the said pilot's control wheel to the aerodynamic control surfaces on the wings, disconnecting means to disconnect the control of the aerodynamic surfaces from the said pilot's control wheel when the wings are folded, steerable means on the ground supporting means forward of the C.G., control means connecting the steerable ground supporting means to the said pilot's control wheel for steering the vehicle on the ground, disconnecting means to disconnect the said pilot's control wheel from the steerable ground supporting means for flight and for takeoff and landing.

References Cited in the file of this patent

UNITED STATES PATENTS

| | | |
|---|---|---|
| D. 153,331 | Zuck | Apr. 5, 1949 |
| 2,692,095 | Carpenter | Oct. 19, 1954 |
| 2,792,191 | Perry | May 14, 1957 |